United States Patent [19]

Kikuchi et al.

[11] Patent Number: 5,133,002
[45] Date of Patent: Jul. 21, 1992

[54] RADIOTELEPHONE SYSTEM THAT MAINTAINS SYNCHRONIZATION BETWEEN BASE AND SUBORDINATE UNITS WHILE SHIFTING CARRIER FREQUENCIES

[75] Inventors: Hajime Kikuchi; Kazuhiko Nishi, both of Tokyo; Youichi Kawaguchi, Yokohama, all of Japan

[73] Assignee: ASCII Corporation, Japan

[21] Appl. No.: 556,335

[22] Filed: Jul. 20, 1990

[30] Foreign Application Priority Data

Jul. 28, 1989 [JP] Japan .................................. 1-195877
Jul. 28, 1989 [JP] Japan .................................. 1-195878

[51] Int. Cl.$^5$ .............................................. H04M 11/00
[52] U.S. Cl. .................................. 379/58; 379/202; 455/51.1; 455/57.1
[58] Field of Search .................. 379/58, 61, 63, 158, 379/202; 455/54, 60, 62, 63, 68, 71, 51, 57

[56] References Cited

U.S. PATENT DOCUMENTS

| | | | |
|---|---|---|---|
| 3,310,741 | 3/1967 | Uitermark et al. | 379/58 |
| 4,558,453 | 12/1985 | Mimken | 455/63 |
| 4,570,265 | 2/1986 | Thro | 455/63 |
| 4,656,625 | 4/1987 | Nojiri et al. | 379/202 |
| 4,797,876 | 1/1989 | Ratcliff | 379/202 |

FOREIGN PATENT DOCUMENTS

| | | | |
|---|---|---|---|
| 0039968 | 3/1985 | Japan | 379/61 |
| 61-102830 | 5/1986 | Japan . | |
| 0295527 | 12/1987 | Japan | 379/61 |

Primary Examiner—James L. Dwyer
Assistant Examiner—Dwayne D. Bost
Attorney, Agent, or Firm—Andrus, Sceales, Starke & Sawall

[57] ABSTRACT

A radiotelephone system having a base unit and a plurality of subordinate units for carrying out radiocommunication between the base unit and the subordinate units. The base unit sends transmitting carriers to the subordinate units and gets receiving carriers from the subordinate units. The system includes a first frequency varying part for periodically shifting transmitting-/receiving carrier frequencies of the base unit from a given frequency of one operating interval to another frequency of another operating interval. A first synchronizing signal part generates a synchronizing signal in synchronism with a time period determined from the shifting of the carrier frequencies. A second synchronizing signal part extracts a synchronizing signal from a receiving carrier signal received by each of the subordinate units. A second frequency varying part shifts receiving/transmitting carrier frequencies of each of the subordinate units from a frequency of one operating interval to another frequency of another operating interval in synchronism with a time period determined by the synchronizing signal extracted by the second synchronizing signal part.

7 Claims, 6 Drawing Sheets

RADIOTELEPHONE SYSTEM THAT MAINTAINS SYNCHRONIZATION BETWEEN BASE AND SUBORDINATE UNITS WHILE SHIFTING CARRIER FREQUENCIES

BACKGROUND OF THE INVENTION

The present invention generally relates to radiotelephone systems, and more particularly to a radiotelephone system having a base unit and a plurality of subordinate units for carrying out radiocommunication between the base unit and the subordinate units.

A conventional radiotelephone system usually performs carrier sensing to find a particular carrier frequency (channel) which is not in use at that instant among a number of given carrier frequencies (channels), and assigns the sensed free frequency to the base unit and to the subordinate unit (hereinafter referred to as a sub-unit) as a sending carrier frequency to be used for the communication, thus preventing radio interference with another radiotelephone system. In this manner, the conventional radiotelephone system enables a radiocommunication to be carried out between the base unit and the sub-unit without causing radio interference.

However, in the conventional system discussed above after the carrier sensing, the base unit and the subordinate units continuously make use of a fixed sending carrier frequency or a fixed receiving carrier frequency during radiocommunication. And the contents of telephone communication are transmitted and received via a carrier wave, and thus there is a problem in that using a common receiver allows any person to pick up information of the radiocommunication from the carrier wave. And, for those who operate such a radiotelephone system, it is a fear that the privacy during telephone communication is not always kept.

And a radiotelephone system having a base unit and a plurality of sub-units usually provides the capability of holding a so-called telephone conference among the sub-units or among the sub-units plus an external unit connected to a telephone line of the base unit. In order to hold such a telephone conference among, for example, first and second sub-units and the external unit, the base unit has to send a mixed speech or voice between the first and second sub-units to the external unit, send another mixed speech between the external unit and the first sub-unit to the second unit, and send still another mixed speech between the second sub-unit and the external unit to the first sub-unit. The first and second sub-units have to send each speech to the base unit. Therefore, four different channels are required for such a radiotelephone system to carry out the telephone conference. If one more sub-unit is installed on the radiotelephone system, two additional channels are required to allow such a sub-unit added to take part in the telephone conference. The larger the system becomes, the broader the bandwidth becomes. Because of this, the conventional radiotelephone system usually has to employ a broad bandwidth, which arises a problem in putting the system into practical use.

SUMMARY OF THE INVENTION

Accordingly, it is a general object of the present invention to provide a novel and useful radiotelephone system in which the above described problems are eliminated.

Another and more specific object of the present invention is to provide a radiotelephone system having a base unit and a plurality of subordinate units for carrying out radiocommunication between the base unit and the subordinate units, the base unit having one or more transmitting sections and one or more receiving sections, the transmitting sections sending transmitting carriers to the subordinate units, the receiving sections getting receiving carriers from the subordinate units, and each of the subordinate units having a transmitting part and a receiving part, the radiotelephone system including a first frequency varying part for periodically shifting transmitting carrier frequencies of the transmitting section from a predetermined transmitting carrier frequency of one operating interval of the radiotelephone system to another predetermined transmitting carrier frequency of another, successive operating interval of the radiotelephone system and for periodically from a predetermined receiving carrier frequency of one operating interval of the radiotelephone system to another predetermined receiving carrier frequency of another, successive operating interval of the radiotelephone system shifting receiving carrier frequencies of the receiving section from a predetermined receiving carrier frequency of one operating interval of the radiotelephone system to another predetermined receiving carrier frequency of another, successive operating interval of the radiotelephone system, a first synchronizing signal part for generating a synchronizing signal in a synchronous manner with a time period determined from the shifting of the transmitting and receiving carrier frequencies of the base unit due to the first frequency varying part, the synchronizing signal being sent by the first synchronizing signal part from the transmitting section of the base unit to the subordinate units, a second synchronizing signal part for extracting a synchronizing signal from a receiving carrier signal received by each receiving part of the subordinate units, and a second frequency varying part for shifting receiving carrier frequencies of each receiving part to make a receiving carrier frequency at a given operative interval different from that at another preceding operative interval and for shifting transmitting carrier frequencies of each transmitting part to make a transmitting carrier frequency at a given operative interval different from that at another preceding operative interval in a synchronous manner with a time period determined by the synchronizing signal extracted by the second synchronizing signal part. According to the present invention, it is possible to keep in secret the conversation during telephone communication and prevent any external person from intercepting the contents of the conversation. And the present invention facilitates the synchronization of varying carrier frequencies between the base unit and the sub-units.

Another object of the present invention is to provide a radiotelephone system in which the base unit has two transmitting sections and five receiving sections, said first frequency varying part acting to shift periodically transmitting carrier frequencies of the transmitting sections and receiving carrier frequencies of the receiving sections to make one transmitting or sending carrier frequency in one operating interval different from that in another operating interval. According to the present invention, it is possible for the base unit to be radiocommunicated with five subordinate units, and the information of the conversation can be kept confidential during telephone communication.

Still another object of the present invention is to provide a radiotelephone system in which the first synchronizing signal part generates a synchronizing signal at given time intervals by delaying the shifting of the transmitting and receiving carrier frequencies carried out by the first frequency generating means. According to the present invention, it is possible to make the shifting of the transmittting and sending carrier frequencies of the sub-units coincident with the shifting of the transmitting and receiving carrier frequencies of the base unit, thus preventing the occurrence of a deviation in operating intervals.

A further object of the present invention is to provide a radiotelephone system having a base unit and a plurality of subordinate units for carrying out radiocommunication between them, the base unit having a transmitting section and a receiving section, the base unit further including a speech mixing part for generating a mixed speech signal by mixing all speech signals sent from the subordinate units taking part in a telephone conference to the base unit and a speech signal sent from a telephone line connected to the base unit, the mixed speech signal generated by the speech mixing part being transmitted from the transmitting section of the base unit to each of the subordinate units taking part in the telephone conference, thus allowing the telephone conference to be held. According to the present invention, it is possible to ensure a small number of carrier frequencies required for holding a telephone conference with a narrow frequency bandwidth used.

Other objects and further features of the present invention will be apparent from the following detailed description when read in conjunction with the accompanying drawings.

DESCRIPTION OF THE PREFERRED EMBODIMENT

Figure 1:
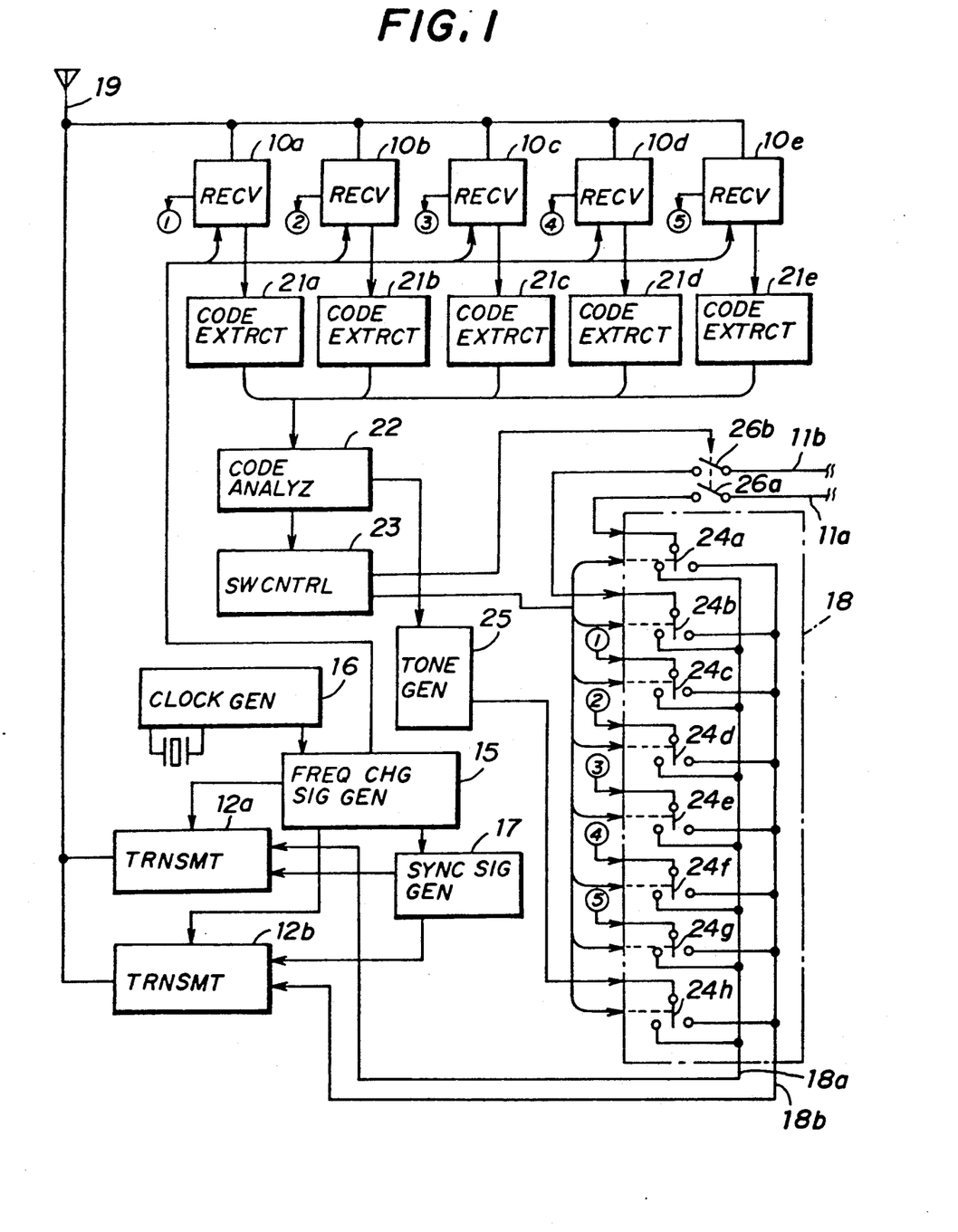
FIG. 1 is a block diagram showing an embodiment of a base unit of a radiotelephone system according to the present invention.
Figure 2:
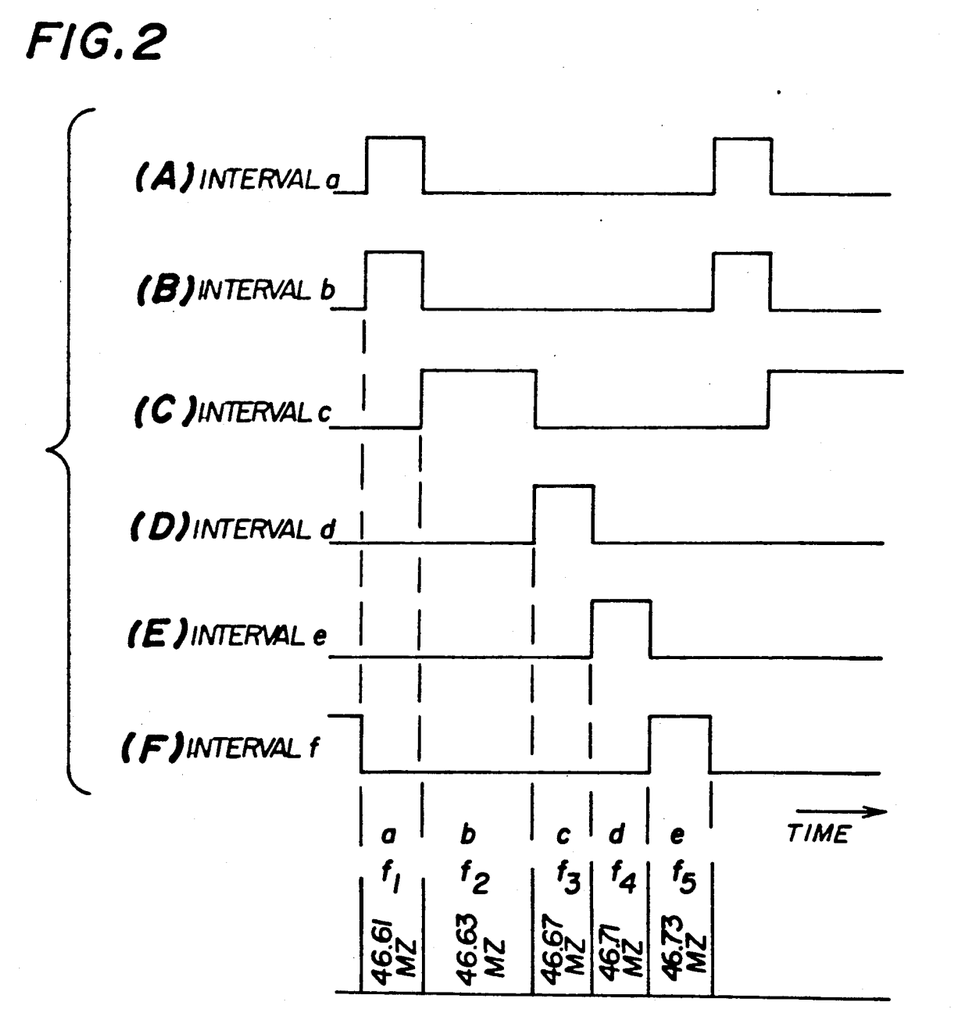
FIG. 2 is a chart for explaining the frequency change intervals or phases according to the present invention.

Referring first to FIGS. 1 and 2, a description will be given of a base unit of a radiotelephone system according to the present invention. As shown, the base unit includes five receiving sections 10a through 10e the number of which is equal to or not smaller than the number of sub-units discussed below, and two transmitting sections 12a and 12b the number of which is not smaller than the number of telephone lines 11a and 11b to be connected to the radiotelephone system.

A frequency change signal generating part 15 generates a frequency change signal and a frequency change synchronizing signal to be transmitted to the receiving parts 10a through 10e and to the transmitting parts 12a and 12b each time clock pulses generated by a clock pulse generating part 16 are supplied. The frequency change synchronizing signal is, for example, a pulse signal with 1-second period as shown in (A) in FIG. 2. In this respect, five different operating intervals or time phases with separate timings of high level as in (B) through (F) in FIG. 2 are predetermined so that a frequency change cycle including these operating intervals or time phases is synchronous with the timing of the synchronizing signal high. The frequency change signal generating part 15 supplies to the receiving part 10a the frequency change signal of a varying receiving frequency. This varying receiving carrier frequency of the base unit is changed periodically to a frequency f1 (e.g. 46.61 MHz) at phase a, a frequency f2 (e.g. 46.63 MHz) at phase b, a frequency f3 (e.g. 46.67 MHz) at phase c, a frequency f4 (e.g. 46.71 MHz) at phase d, and a frequency f5 (e.g. 46.73 MHz) at phase e. Similarly, the frequency change signal generating part 15 supplies a frequency change signal of a varying frequency which is varied periodically as listed in TABLE below, to the receiving parts 10b through 10e and to the transmitting parts 12a and 12b. And transmitting carrier frequencies f6 and f7 of the base unit are, for example, 46.77 MHz, 46.81 MHz respectively.

TABLE

| | | Operating interval or Phase | | | | |
|---|---|---|---|---|---|---|
| | | a | b | c | d | e |
| Receivng | 10a | f1 | f2 | f3 | f4 | f5 |
| Receivng | 10b | f2 | f3 | f4 | f5 | f1 |
| Receivng | 10c | f3 | f4 | f5 | f1 | f2 |
| Receivng | 10d | f4 | f5 | f1 | f2 | f3 |
| Receivng | 10e | f5 | f1 | f2 | f3 | f4 |
| Trnsmtng | 12a | f6 | f7 | f6 | f7 | f6 |
| Trnsmtng | 12b | f7 | f6 | f7 | f6 | f7 |

A synchronizing signal generator 17 delays the sending of the frequency change synchronizing signal by a predetermined time, and at predetermined time intervals (e.g. one minute) generates and transmits a synchronizing signal of approximately 300 to 500 Hz to the transmitting parts 12a and 12b for a high-level period of the delayed frequency change synchronizing signal. The above described time delay is necessary for preventing an operating interval deviation in the frequency change synchronizing signal which may be produced between the base unit and the sub-unit if the frequency change synchronizing signal is transmitted without delay. This operating interval deviation is resulted from a delay of the frequency change synchronizing signal within the transmitting parts 12a, 12b and a delay within a receiving part 31 and within a synchronizing signal extracting part 33 of the sub-unit discussed below.

The transmitting parts 12a, 12b superimpose the synchronizing signal on speech signals supplied from two signal lines 18a and 18b of a switching circuit 18, and carry out modulation (e.g. frequency modulation) of the speech signals. The transmitting parts 12a and 12b then carry out conversion of the modulated signals into a signal of a sending carrier frequency (f6 or f7) as specified by the frequency change signal, and transmits it from an antenna 19.

A carrier signal received by the antenna 19 from a sub-unit is supplied to the receiving parts 10a to 10e, where the tuning and the demodulation (e.g. frequency demodulation) of the carrier signal are carried out to a signal of a receiving carrier frequency (f1 to f5) as specified by the frequency change signal. The receiving parts 10a to 10e respectively supply the demodulated signal to code extracting parts 21a to 21e, where a control code is extracted from the demodulated signal. A code analyzing part 22 analyzes the control code and supplies the result to a switching control part 23 or to a tone generating part 25. The switching control part 23 carries out switching control over the switches 24a to 24h of the switching circuit 18 and the line connecting switches 26a and 26b.

Traveling contacts of switches 24a and 24b are connected to telephone lines 11a and 11b, respectively. Each demodulated signal output of the receiving parts 10a to 10e is supplied to each traveling contact of the switches 24c to 24g, and a noticeable sound such as a "holding sound", a "busy sound" which is generated by the tone generating part 25 is supplied to the traveling contact of the switch 24h. The switching control part 23 handles the switching on and off of the switches 24a through 24h to connect to and disconnect from the signal lines 18a, 18b. Line connection switches 26a, 26b which set allow the base unit to connect to and disconnect from the telephone lines 11a, 11b.

Figure 3:
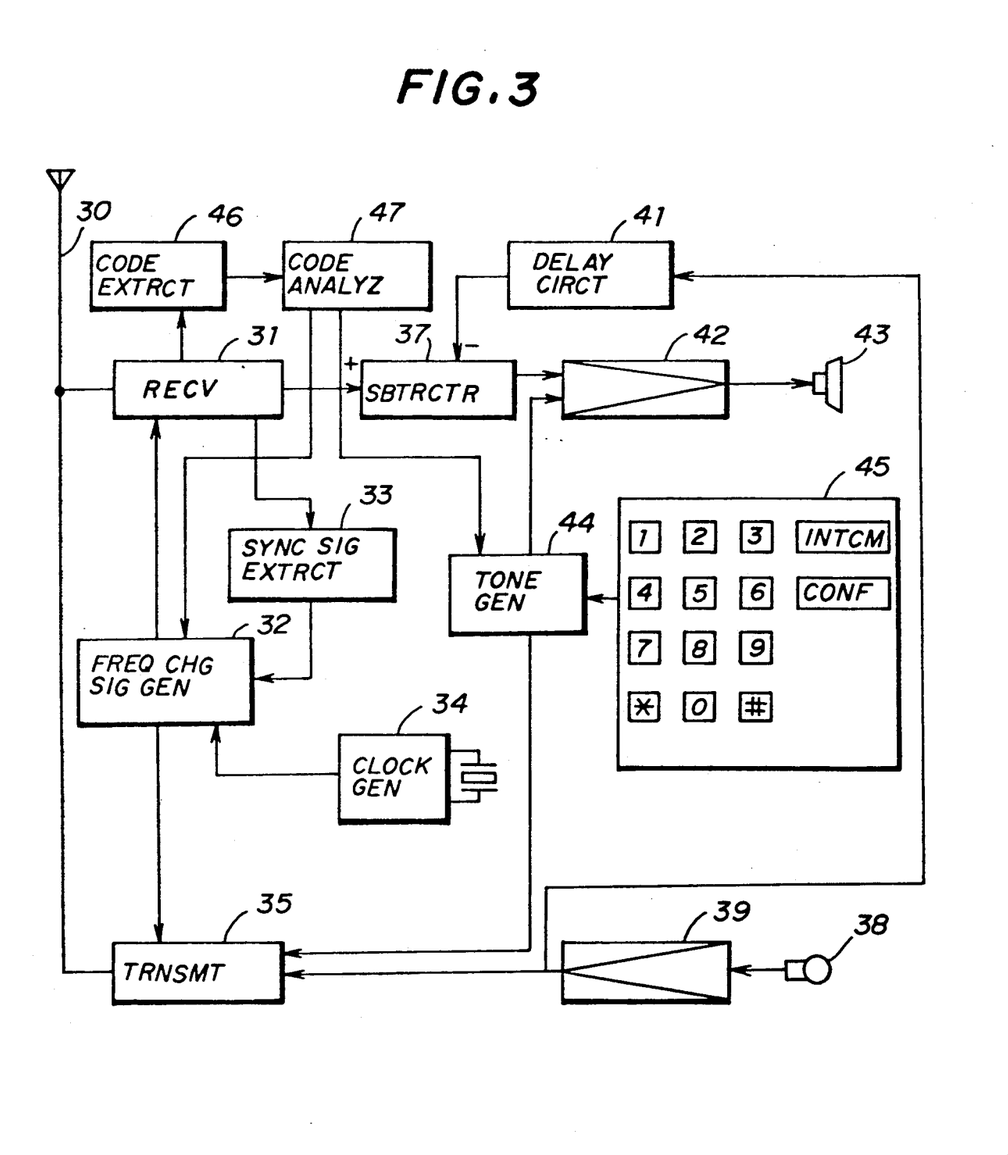
FIG. 3 is a block diagram showing an embodiment of a sub-unit of a radiotelephone system according to the present invention.

Referring next to FIG. 3, a description will be given of the structure of a sub-unit according to the present invention.

A carrier signal from the base unit is received by an antenna 30 and is supplied to a receiving part 31. In the receiving part 31, the carrier signal is tuned and demodulated (e.g. frequency demodulation) to a signal of a receiving carrier frequency (f6 or f7) as specified by a frequency change signal supplied from a frequency change signal generating part 32. A synchronizing signal extracting part 33 extracts every one minute a synchronizing signal from the demodulated signal on which the synchronizing signal is superimposed, and supplies the synchronizing signal to the frequency change signal generating part 32. The frequency change signal generating part 32 in a synchronous manner with this signal generates first and second frequency change signals to the transmitting part 35 and the receiving part 31, respectively. In step with clock pulses from a clock pulse generating part 34, the first frequency change signal from the part 32 determines which carrier frequency among f1 through f5 is assigned to the transmitting part 35 of the corresponding sub-unit at that operating interval in accordance with the operating intervals or time phases shown in (B) through (F) in FIG. 2. The second frequency change signal from the part 32 serves to determine which carrier frequency out of f6 and f7 is assigned to the receiving part 31 at that operating interval or phase.

The demodulated signal from the receiving part 31 is supplied to a subtracter 37. A speech signal received by a microphone 38 is amplified by an amplifier 39, and supplied to the transmitting part 35, and at the same time supplied to a delay circuit 41. In the delay circuit 41, the transmission is delayed by a predetermined time and then supplied to the subtracter 37. In the subtracter 37, a speech signal from the subordinate unit itself is subtracted from the demodulated signal from the part 31. The resulting signal is amplified by an amplifier 42, and the amplified speech is given out from a speaker 43. A time delay by the delay circuit 41 is necessary, because this time delay corresponds with a time required for the receiving part 31, after the signal is modulated and transmitted from the transmitting part 35 to the base unit, to receive a reply from the base unit and demodulate the signal and supply it to the subtracter 37.

A code extracting part 46 extracts a control code from the demodulated signal received from the receiving part 31. The control code is analyzed by a code analyzing part 47, and the code analyzing part 47 supplies the results of the analysis to a tone generating part 44. At the same time, the code analyzing part 47 instructs the frequency change signal generating part 32 as to which of the transmitting sections 12a and 12b of the base unit the receiving carrier frequency is to be assigned to.

In accordance with the instructions by the code extracting part 46 and in accordance with the keystrokes inputted from a key operation part 45, the tone generating part 44 generates a noticeable sound such as a "push sound", a "calling sound", a "holding sound", and supplies such sound to the amplifier 42 and to the transmitting part 35. The transmitting part 35 serves to mix the signal from the amplifier 39 with the signal from the tone generating part 44 and carries out modulation (e.g. frequency modulation) of the mixed signal. And the transmitting part 35 converts the modulated signal into a signal of a transmitting carrier frequency (f1 to f5) which is specified by the frequency change signal, and transmits the signal of the thus varied frequency from an antenna 30. For example, assuming that the sub-unit now corresponds with the receiving section 10a of the base unit, a transmitting carrier frequency of the transmitting part 35 is varied periodically as indicated in the TABLE above, that is, the transmitting carrier frequency is changed sequentially from phase a to phase e as in the column of the receiving part 10a in the TABLE, after the synchronizing signal is received.

Figure 4:
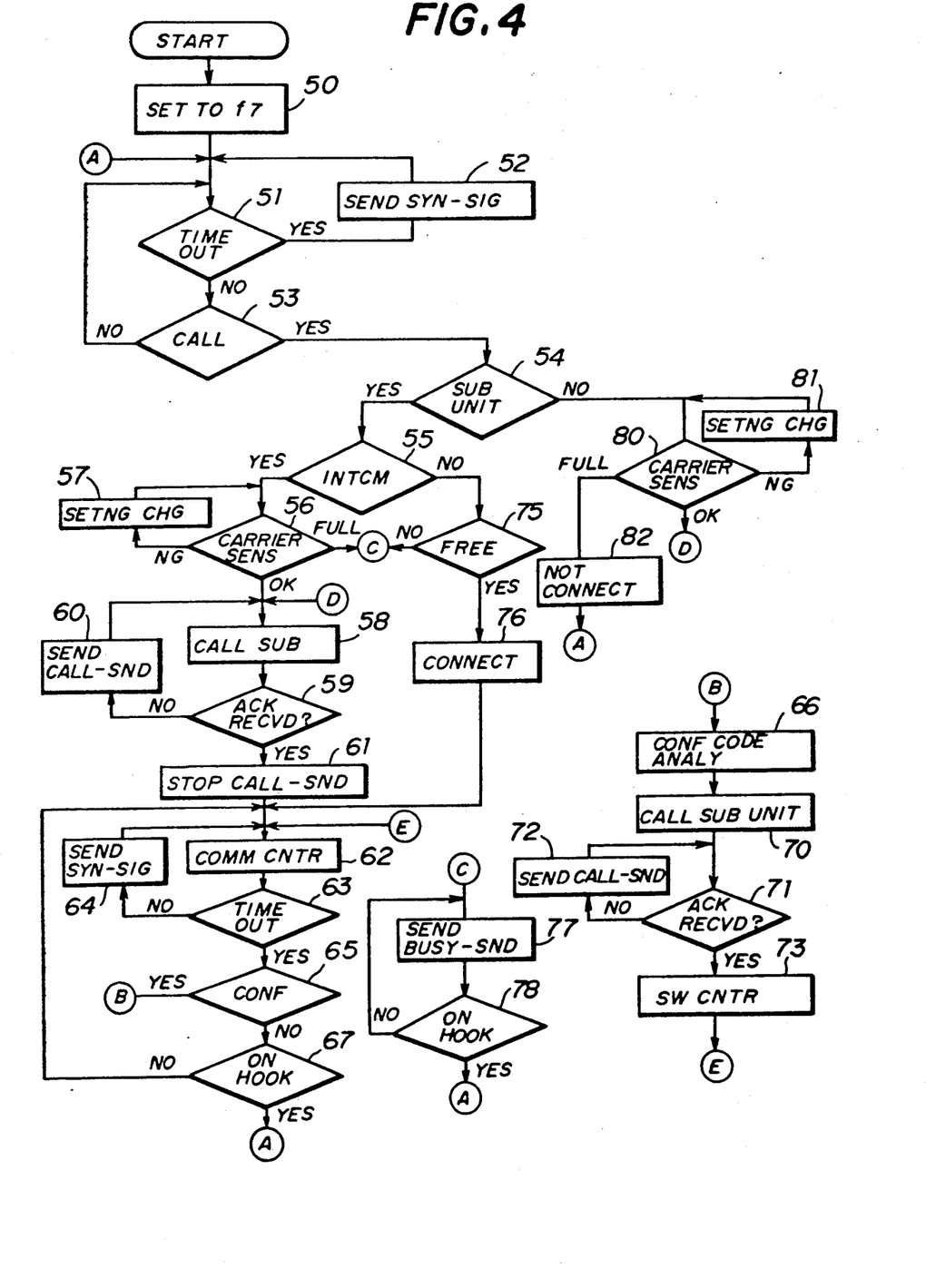
FIG. 4 is a flow chart for explaining the operation of the base unit according to the present invention.

Next, a description will be given of the operation of the base unit according to the present invention, by referring to FIG. 4.

A step 50 sets a sending carrier frequency of the transmitting part 12a to "f7", after the base unit is powered on. Steps 51 and 52 transmit a synchronizing signal from the sending part 12a each time a timeout takes place (e.g. every one minute). A step 53 repeats this until a call is received from a telephone line or any of the remaining sub-units. After the call is received, a decision is made on whether the call is received from a sub-unit.

When the call is received from the sub-unit, a step 55 makes a decision on whether the intercom (INTCM) mode is selected to carry out intercommunication among the sub-units. A step 56 performs carrier sensing to check whether the INTCM mode is selected. The carrier sensing is also done to check if there is a free frequency among the frequencies f1 through f5 at that operating interval or phase. If the frequency is found "busy" (NG), then a step 57 changes a frequency setting. For example, if the frequency f1 is in a "busy" state, then the setting is changed to the frequency f2. This procedure is repeated until a free frequency is first found (OK) among those frequencies. Using that frequency which is in a free state, the base unit gives a call to the receiving-side sub-unit and wait for an acknowledgment (ACK) from that sub-unit (step 59). If the base unit receives no acknowledgment, then a step 60 sends a calling sound to the sending-side sub-unit and the base unit returns to the previous steps. If the base unit receives the acknowledgement, then a step 61 stops sending the calling sound to the sending-side sub-unit, and a step 62 performs communication control to periodically shift the sending carrier frequencies f6 and f7 and the receiving carrier frequencies f1 through f5 of the base unit. In addition, steps 63 and 64 transmit a synchronizing signal at given time intervals (e.g. one minute) as determined with a timer setting.

After this, a step 65 makes a decision on whether a code of the telephone conference mode (CONF) indicating that a plurality of the sub-units are communicated with an external telephone unit is specified. If the code is specified, then a step 66 is next taken. If the code is not specified, then a step 67 makes a decision on whether the telephone communication is ended by placing the receiver on the hook (ON HOOK). If the answer is yes, then the step 51 is taken. If the answer is no, then the step 62 is taken.

In the telephone conference mode, a step 66 analyzes the CONF code to determine which sub-unit is made to take part in the telephone conference. A step 70 calls a particular sub-unit. A step 71 awaits receiving an acknowledgment from that sub-unit. If no acknowledgment is received, then a step 72 is taken where a calling sound is sent to the telephone line and the sub-units being communicated one another. If an acknowledgment is received, then a step 73 connects a traveling contact of a switch of the switching circuit 18, corresponding to the sub-unit sending the acknowledgment, to either the signal line 18a or the signal line 18b. And the processing is returned to the step 62. For example, during the communication between the telephone line 11a and the sub-unit corresponding to the receiving section 10a, assume that the telephone conference mode is selected and the sub-unit corresponding to the receiving section 10b is about to take part in the telephone conference. The traveling contacts of the switches 24b and 24c are connected to the signal line 18a. The switching circuit 18 acts to connect the traveling contact of the switch 24d to the signal line 18a for making the sub-unit corresponding to the receiving section 10b to take part in the telephone conference.

If the step 55 makes a decision that the intercom mode is not selected and that the receiving-side sub-unit is the telephone line, then a step 75 makes a decision whether there is a free telephone line. If the answer is yes, then a step 76 connects the switch 24a or the switch 24b to the signal line 18a or the signal line 18b to make a connection with that free line, and the step 62 is next taken. If there is no free telephone line, then a step 77 is next taken. This is the case where the step 56 makes a decision that all the frequencies f1 through f5 are busy, or the system is in a carrier-full state. The step 77 sends a "busy sound" to the sending-side line or the calling-side sub-unit. A step 78 repeats the sending of the "busy sound" until a "ON HOOK" state occurs. If the "ON HOOK" state is found, then the processing is returned to the step 51.

If a step 54 makes a decision that the call is received from the telephone line, then a step 80 performs carrier sensing to check if the sending frequency is free. If that frequency is free (OK), then the step 58 is taken. If that frequency is not free, then a step 81 is taken to change the setting of the frequencies f1 through f5. Or, if the system is in the carrier-full state, then a step 82 is taken to send a "busy sound" to the sending-side line without making a connection with that line and the processing is returned to the step 51.

Figure 5:
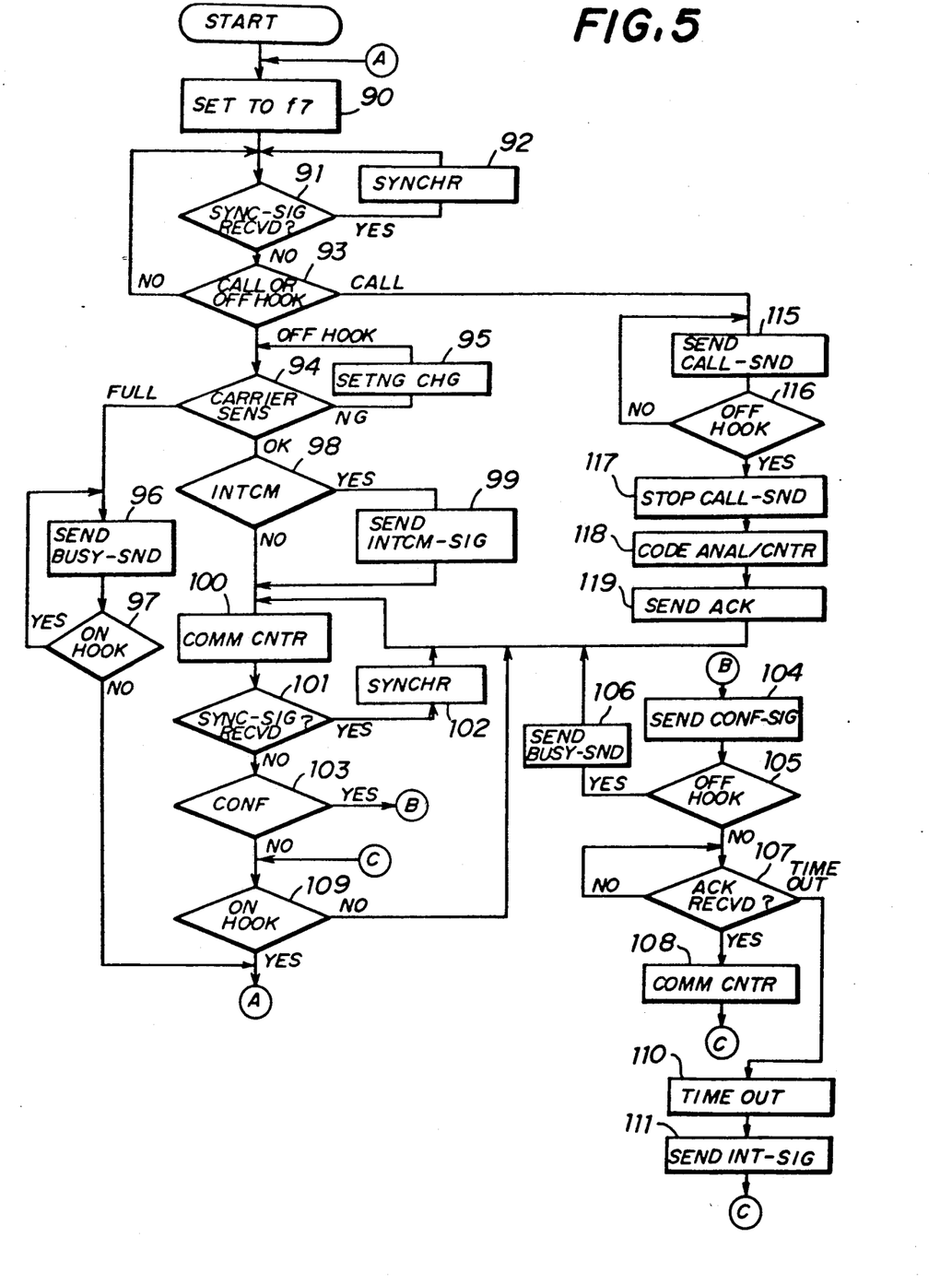
FIG. 5 is a flow chart for explaining the operation of the sub-unit according to the present invention.

Next, a description will be given of the operation of the sub-unit according to the present invention, by referring to FIG. 5.

A step 90 sets first the receiving carrier frequency of the sub-unit to "f7" after the sub-unit is powered on. It should be noted that the sub-unit receives the receiving carrier of either f6 or f7 from the base unit and sends the transmitting carrier of any frequency among the f1 through f5 to the base unit or to another sub-unit. A step 91 waits for a synchronizing signal being extracted, and if the receiving part 31 receives the synchronizing signal, then a step 92 performs synchronization of the frequency change signal generating part 32. If no synchronizing signal is received, then a step 93 makes a decision on whether the sub-units receiver is left off the hook or cradle to call another sub-unit (OFF HOOK), or whether a call is received by the sub-unit from another sub-unit (CALL). If the case is neither the former nor the latter, then the step 91 is taken.

If the sub-unit is calling another sub-unit (OFF HOOK), then a step 94 performs carrier sensing with respect to the frequencies f1 through f5. If the carrier sensing is ended with the sensed frequency in the "busy" state (NG), then a step 95 changes the frequency setting. And, if the system is in the carrier-full state, then steps 96 and 97 repeat sending a "busy sound" to the calling-side sub-unit until the ON HOOK state is sensed, and the step 91 is taken. If the carrier sensing is ended with the frequency in the free state (OK) and the sub-unit is in the INTCM mode, then a step 99 transmits a code indicating the INTCM mode and a step 100 is next taken. The step 100 carries out the communication control, or performing the shifting of the transmitting frequencies f1 to f5 and the shifting of the receiving frequencies f6 and f7. After this, steps 101 and 102 perform the synchronization only when the synchronizing signal is received. Further, a step 103 makes a decision on whether the CONF mode is selected. If the answer is yes, then a step 104 is taken. If the CONF mode is not selected, then a step 109 makes a decision on whether the unit is in the ON HOOK state. If the telephone communication goes on, then the processing is returned to the step 100. If the telephone communication is ended, then it is returned to the step 90.

When in the CONF mode, the step 104 transmits a code indicating the telephone conference mode, and a step 105 makes a decision on whether the counterparty sub-unit which takes part in the telephone conference is in the OFF HOOK state. If the counterparty is in the OFF HOOK state, or it is already connected to any other unit, then a step 106 transmits a "busy sound" to the calling-side sub-unit and the processing is returned to the step 100. If the counterparty is in the ON HOOK mode, then the step 107 awaits an acknowledgment being sent from that sub-unit. If the acknowledgment is received, then a step 108 performs the communication control to periodically shift the transmitting carrier frequencies f1 to f5 of the part 35 and periodically shift the sending carrier frequencies f6 and f7 of the part 31. And the step 109 is next taken. If the elapsed time exceeds a prescribed timeout period, then a step 110 performs a timeout processing and a step 111 transmits an interruption signal to the counterparty sub-unit, and the processing is returned to the step 109. When the step 93 makes a decision that a call is received from another sub-unit, a step 115 gives out a "calling sound" from a speaker 43 of the sub-unit itself and a step 116 repeats this until the receiver of the sub-unit is lifted up, or the OFF HOOK state of the sub-unit is sensed. A step 117 stops making the calling sound when the receiver is raised and the OFF HOOK state is sensed. A step 118 performs the analysis/control of a receiving code, and a step 119 generates and transmits an acknowledgment to the code analysis/control, then the step 110 is next taken. The code analysis/control step 118 determines whether the calling-side unit is the telephone line or another sub-unit, and determines whether the receiving carrier frequency of the receiving part 31 corresponds with either the transmitting section 12a or 12b of the base unit.

As described above, the synchronizing signal is transmitted from the base unit to the sub-unit in a synchronous manner with the given time intervals at which the receiving and transmitting carrier frequencies are varied, the synchronizing signal being placed on the speech signal containing the information of a telephone conversation. The sub-unit extracts the synchronizing signal from the signal received, and shifts the frequencies of the receiving and transmitting signals in a synchronous manner with a time interval as specified by the synchronizing signal. Because of this, it is possible that the base unit and the sub-unit vary periodically the transmitting and receiving carrier frequencies at the same rate. Therefore, the synchronization of the shifting of the carrier frequencies of both the units is easy to be achieved. A time period for which any external person may intercept the carrier wave to take the information thereof using a common receiver is limited and short enough to prevent him from tuning the carrier frequency which is periodically shifted at given time intervals on the radiotelephone system according to the present invention, thus allowing the telephone conversation on the present system to be kept in secret. In addition, because the base unit transmits the synchronizing signal placed on the speech signal carrying the information of the radiocommunication, it is possible for the present invention to provide a simple structure of the radiotelephone system as well as a narrow bandwidth of transmitting and receiving carriers employed.

Figure 6:
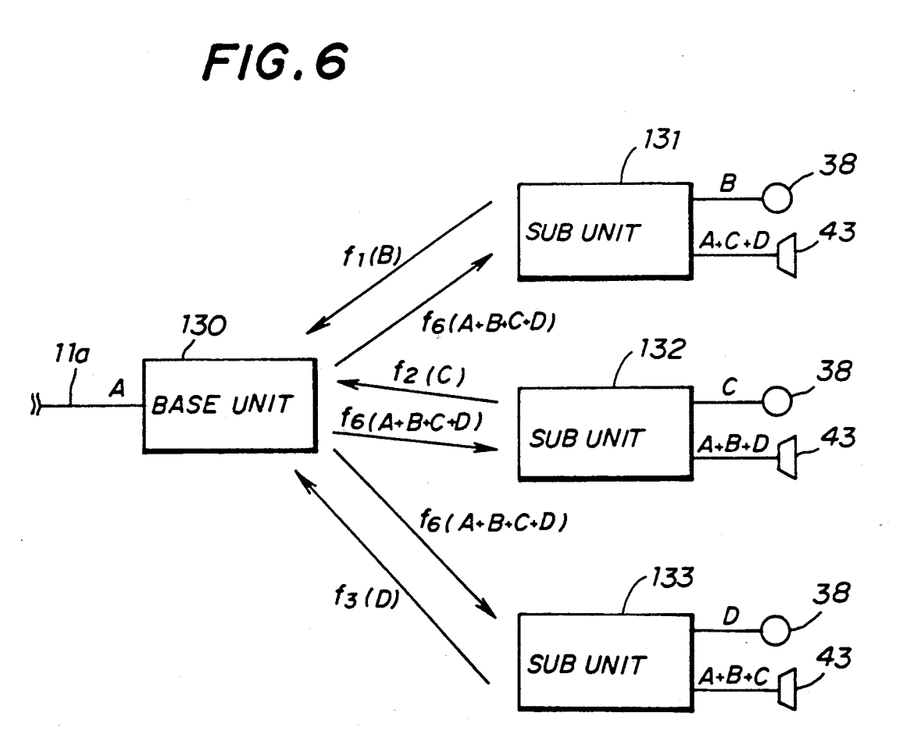
FIG. 6 is a schematic diagram for explaining a telephone conference held with the radiotelephone system according to the present invention.

Referring next to FIG. 6, a description will be given of the operation of the radiotelephone system in a telephone conference mode. Assume that a telephone conference is being held between a sub-unit 131 and an external unit connected to a telephone line 11a of a base unit 130. Sub-units 132 and 133 of the radiotelephone system additionally take part in the telephone conference. In FIG. 6, "A" indicates an incoming speech signal sent from the external unit via the telephone line 11a to the base unit 130, and "B", "C" and "D" respectively denote incoming speech signals to the sub-units 131, 132 and 133 from the individual microphones 38 thereof, which correspond with the receiving parts 10a, 10b and 10c of the base unit.

At the "operating interval a", the speech signal "B" of carrier frequency f1 is transmitted from the sub-unit 131 to the base unit 130. Similarly, the speech signal "C" of carrier frequency f2 and the speech signal "D" of carrier frequency f3 respectively are transmitted from the sub-units 132 and 133 to the base unit 130. Within the base unit 130, the switch 26a is turned on and the switches 24a and 24c through 24e are connected to the signal line 18a to allow communication between the telephone line 11a and the sub-units 131 through 133. Therefore, a mixed speech signal "A+B+C+D" is supplied to the transmitting part 12a of the base unit, and the mixed speech signal "A+B+C+D" of carrier frequency f6 is transmitted from the base unit 130 to each of the sub-units 131 through 133. And, within the sub-unit 131 the mixed speech signal "A+C+D" is obtained through the subtracter 37 which subtracts the speech signal "B" due to the microphone 38 of the sub-unit 131 itself from the mixed speech signal "A+B+C+D", and such a mixed speech is given out from the speaker 43. Similarly, within the sub-unit 132 and the sub-unit 133 respectively the speech signals "A+B+D" and "A+B+C" are obtained through the individual subtractors 37, and such mixed speeches are given out from the respective speakers 43.

As described above, several speech signals from the telephone line 11a and from the sub-units 131 through 133 which take part in the telephone conference are mixed within the base unit 130, allowing a mixed speech signal of a common carrier frequency to be transmitted to each of the sub-units 131 through 133. Accordingly, the number of different carrier frequencies used in the telephone conference becomes smaller, and, in other words, the number of necessary channels is advantageously equal to the number of one base unit plus three sub-units in total. When compared with the conventional system, the radiotelephone system of the present invention therefore provides a smaller number of channels required for holding a telephone conference, with a narrower bandwidth used. The same discussion is also applicable to the case where an intercommunication is performed among the sub-units within the radiotelephone system in the INTCM mode. This intercommunication is held among three or more sub-units via the base unit which has no external unit connected to the telephone line 11a or 11b.

And, because transmitting carrier frequencies of the base unit and transmitting carrier frequencies of the sub-units are periodically shifted in a synchronous manner, it is difficult for an external person using a common receiver to succeed in tuning of such carrier frequencies to pick up the information from the carrier wave, thus protecting the privacy of those taking part in the telephone conference.

In the case where the sub-unit according to the present invention is provided with no delay circuit 41 and no subtracter 37, a speech received from the microphone 38 may be given out from the speaker 43 of the same sub-unit. However, this does not cause a major problem when compared with the above described benefits offered by the present invention.

Further, the present invention is not limited to the above described embodiment but various variations and modifications may be made without departing from the scope of the present invention.

What is claimed is:

1. A radiotelephone system having a base unit and a plurality of subordinate units for carrying out radiocommunication between the base unit and the subordinate units, said base unit having one or more transmitting sections and one or more receiving sections, said transmitting section sending transmitting carriers to the subordinate units, said receiving sections getting receiving carriers from the subordinate units, and each of the subordinate units having a transmitting part and a receiving part, said radiotelephone system comprising:

first frequency varying means for periodically shifting transmitting carrier frequencies of the transmitting sections from a predetermined carrier frequencies of the transmitting sections from a predetermined carrier frequency of one operating interval of the radiotelephone system to another predetermined carrier frequency of one operating interval of the radiotelephone system to another predetermined carrier frequency of another operating interval of the radiotelephone system and for periodically shifting receiving carrier frequencies of the receiving sections from a predetermined carrier frequency of one operating interval of the radiotelephone system to another predetermined carrier frequency of another operating interval of the radiotelephone system;

first synchronizing signal means for generating a synchronizing signal in a synchronous manner with a time period determined from said shifting of the transmitting and receiving carrier frequencies of the base unit due to said first frequency varying means, said synchronizing signal being sent by said first synchronizing signal means from the transmitting section of the base unit to the subordinate units;

second synchronizing signal means for extracting a synchronizing signal from a receiving carrier signal received by each receiving part of the subordinate units; and second frequency varying means for shifting receiving carrier frequencies of each receiving part to make a receiving carrier frequency at a given operating interval of the radiotelephone system different from that at another operating interval of the radiotelephone system and for shifting transmitting carrier frequencies of each transmitting part to make a transmitting carrier frequency at a given operating interval of the radiotelephone system different from that at another operating interval of the radiotelephone system in a synchronous manner with a time period determined by the synchronizing signal extracted by said second synchronizing signal means.

2. A radiotelephone system as claimed in claim 1, wherein said base unit has two transmitting sections and five receiving sections, said first frequency varying means being capable of periodically shifting transmitting carrier frequencies of said two transmitting sections and receiving carrier frequencies of said five receiving sections to make a transmitting or receiving carrier frequency at a given operating interval of the radiotelephone system different from that at another preceding operating interval of the radiotelephone system.

3. A radiotelephone system as claimed in claim 1, wherein said first synchronizing signal means is capable of delaying said shift of the transmitting and receiving carrier frequencies of the base unit due to said first frequency varying means by a prescribed time and generating said synchronizing signal at prescribed time intervals.

4. A radiotelephone system as claimed in claim 1, wherein said first synchronizing signal means sends a speech signal on which a synchronizing signal within a audio frequency range is superimposed.

5. A radiotelephone system having a base unit and a plurality of subordinate units for carrying out radiocommunication between the base unit and the subordinate units, said base unit having a transmitting section and a receiving section, said transmitting section sending transmitting carriers to the subordinate units, said receiving section getting receiving carriers from the subordinate units, each of the subordinate units having a transmitting part and a receiving part, said radiotelephone system comprising:

first frequency varying means for periodically shifting transmitting carrier frequencies of the transmitting section from a predetermined carrier frequency of one operating interval of the radiotelephone system to another predetermined carrier frequency of another operating interval of the radiotelephone system and for periodically shifting receiving carrier frequency of the one operating interval of the radiotelephone system to another predetermined carrier frequency of another operating interval of the radiotelephone system;

first synchronizing signal means for generating a synchronizing signal in a synchronous manner with a time period determined from said shiftings of the transmitting and receiving carrier frequencies of the base unit due to said first frequency varying means, said synchronizing signal being sent by said first synchronizing signal means from the transmitting section of the base unit to the subordinate units;

second synchronizing signal means for extracting a synchronizing signal from a receiving carrier signal received by each receiving part of the subordinate units; and second frequency varying means for periodically shifting a receiving carrier frequency of one operating interval of the radiotelephone system to another predetermined carrier frequency of another operating interval of the radiotelephone system and for periodically shifting a transmitting carrier frequency of each said transmitting part from a predetermined carrier frequency of one operating interval of the radiotelephone system to another predetermined carrier frequency of another operating interval of the radiotelephone system in a synchronous manner with a time period determined by the synchronizing signal extracted by said second synchronizing signal means, said base unit having speech mixing means for generating a mixed speech signal by mixing all speech signals sent from said subordinate units taking part in a telephone conference to said base units and for generating a speech signal sent from a telephone line connected to said base unit, said mixed speech signal generated by said speech mixing means being transmitted from said transmitting section of said base unit to each of said subordinate units taking part in said telephone conference, thus allowing the telephone conference to be held.

6. A radiotelephone system as claimed in claim 5, wherein said radiotelephone system is further defined as capable of holding a telephone conference among said telephone line and two or more said subordinate units.

7. A radiotelephone system as claimed in claim 5, wherein said radiotelephone system is further defined as capable of holding a telephone conference among three or more said subordinate units.

* * * * *